| United States Patent [19] | [11] Patent Number: 4,786,292 |
| Janz et al. | [45] Date of Patent: Nov. 22, 1988 |

[54] MICROCRYSTALLINE ABRASIVE MATERIAL AND METHOD OF MANUFACTURE

[75] Inventors: Peter Janz; Herwig Winkler, both of Klagenfurt; Georg Gottschamel, Treibach, all of Austria

[73] Assignee: Treibacher Chemische Werke Aktiengesellschaft, Treibach, Austria

[21] Appl. No.: 49,924

[22] Filed: May 15, 1987

[30] Foreign Application Priority Data

Jun. 3, 1986 [AT] Austria .................................. 1503/86

[51] Int. Cl.$^4$ .............................................. B24D 3/00
[52] U.S. Cl. ........................................ 51/293; 51/309
[58] Field of Search ................................... 51/293, 309

[56] References Cited

U.S. PATENT DOCUMENTS

| 4,086,067 | 4/1978 | Busch et al. | 51/309 |
| 4,252,544 | 2/1981 | Takahashi | 51/309 |

FOREIGN PATENT DOCUMENTS 1471331 1/1969 Fed. Rep. of Germany .

Primary Examiner—Paul Lieberman
Assistant Examiner—Willie J. Thompson
Attorney, Agent, or Firm—Kurt Kelman

[57] ABSTRACT

An abrasive material of great hardness and high tenacity particularly suitable for high-pressure grinding consists essentially of a sintered, microcystalline $\alpha$—$Al_2O_3$ abrasive material having a purity of least 98.5% and a density of at least 95% of theoretical density, the $\alpha$—$Al_2O_3$ crystallites of the material being smaller than $4\mu$, preferably smaller than $3\mu$.

19 Claims, No Drawings

MICROCRYSTALLINE ABRASIVE MATERIAL AND METHOD OF MANUFACTURE

The present invention relates to a sintered, microcrystalline alumina abrasive material and a method for the manufacture thereof.

It is known to use various alumina-containing raw materials, such a alumina clay or bauxite, for the manufacture of sintered abrasive materials.

For example, German patent No. 1,471,331 discloses a granular abrasive material produced by compacting comminuted calcined natural bauxite under pressures of up to 703 kp/cm² and subsequently sintering the same at temperatures between 1370° C. and 1570° C. The major part of the crystals of this granular abrasive material has a size of 5 to 30.

U.S. Pat. No. 4,086,067 discloses a porous sintered abrasive grain formed from a mixture of aluminous abrasive material and burn-out material selected from pieces of material such as paradichlorobenzene, crushed walnut shells, cork, plastic and mustard seeds, the burn-out material having a cross-section lying between about 20 and 80% of the grain cross-section and being present in the mixture in a volume percent between about 3.5 and 20, the burn-out material being added to the alumina before sintering to obtain a defined pore volume.

U.S. Pat. No. 4,252,544 discloses sintered alumina abrasive grains having a density of more than 3.75 g/cm³ and a Knoop hardness of more than 1,900 kg/mm². This material has a purity higher than 98% and consists of a mixture of molten or calcined aluminum oxide powder, a fine fraction having a grain size of less than 1$\mu$ and a coarse fraction having a grain size of 3 to 10$\mu$ being mixed and kneaded in the presence of water and a bonding agent, and subsequently extruded. The sintering of the dried and cut pieces is effected at temperatures between 1550° C. and 1650° C.

According to this invention, an abrasive material of great hardness and high tenacity particularly suitable for high-pressure grinding consists essentially of a sintered, microcrystalline $\alpha$-Al$_2$O$_3$ abrasive material having a purity of least 98.5%, i.e. consisting of at least 98.5% of $\alpha$-Al$_2$O$_3$, and a density of at least 95% of theoretical density, the $\alpha$-Al$_2$O$_3$ crystallites of the material being smaller than 4$\mu$, preferably smaller than 3$\mu$.

The invention also provides a simple and cost-effective method of manufacturing such an abrasive material based on the finding that the addition of a highly dispersed $\alpha$-aluminum oxide monohydrate to alumina enables an abrasive material to be prepared, which has high density and tenacity and whose grains have a harder surface than heretofore available alumina abrasive materials.

In the manufacturing method of the present invention, a mixture of finely milled, calcined alumina and 1 to 60%, by weight, of a highly dispersable $\alpha$-aluminum oxide monohydrate is prepared, optionally with the addition of at least one element from the group consisting of Mg, Si, Ti, Zr, Cr, Ni, Ce, Fe and Mn, the mixture is reacted with water and an acid, the reacted mixture is homogenized until a formable mass has been obtained, the mass is formed into shaped bodies by comminuting the formable mass or pressing it into shaped bodies of a regular geometric shape, and the shaped bodies are sintered for 5 minutes to 2 hours at a temperature between 1300° C. and 1700° C.

If the grain size of the calcined alumina or clay and the highly dispersable $\alpha$-aluminum oxide monohydrate is smaller than 2$\mu$, preferably less than 1$\mu$, the end product will have a crystallite size of less than 4$\mu$.

The highly dispersable or colloidal $\alpha$-aluminum oxide monohydrate may be a commercially available pseudo-boehmite, sold under such trademarks as Pural, Dispersal and Versal.

We have found that even minor additions of at least one element from the group consisting of Mg, Si, Ti, Zr, Cr, Ni, Ce, Fe and Mn further improve the effectiveness of the abrasive material. Such additions are in the range of more than 1%, by weight, of the element or elements, based on the alumina content of the abrasive material, the element or elements being added in the preparation of the mixture in the form of an oxide thereof. The effectiveness of these additives is apparently due to the fact that they greatly reduce the crystal growth during sintering and thus assure a highly microcrystalline structure.

The method of the invention has the further advantage that it requires no bonding agents for pressing the formable mass into shaped bodies, such bonding agents negatively affecting the density of the sintered abrasive material because they tend to increase the porosity during sintering.

If the raw materials for the manufacture of the abrasive material, i.e. calcined clay or alumina and $\alpha$-aluminum oxide monohydrate, are not available in sufficiently fine grain size, they are milled in any convenient comminuting process until their grain size does not exceed 2$\mu$, preferable 1$\mu$. Preferably, the wet raw materials are milled in a ball mill using alumina balls. In any case, an acid must be added to prevent agglomeration of the aluminum oxide monohydrate or to disagglomerate the highly dispersed material under mechanical action.

After wet milling, the milled acidic alumina-aluminum oxide monohydrate suspension, with the optional addition of one or more of the above-named elements, is cast from the mill and sufficient water is removed therefrom to obtain a formable mass, which is then comminuted or pressed into shaped bodies of regular geometric shape.

Because of the use of the dispersable $\alpha$-aluminum oxide monohydrate, a formable mass is produced which may be pressed without the addition of any organic or inorganic binder so that the resultant sintered abrasive material has great hardness and tenacity.

The green grains are preferably formed by pressing or extruding the formable mass through a matrix to obtain strands of uniform cross section, which may then be cut into sections of predetermined length, dried and sintered. Sintering is effected in an oxidizing atmosphere at temperatures between 1300° C. and 1700° C., preferably 1350° C. and 1550° C. The sintering time is a function of the temperature, the type of sintering furnace used and primarily of the composition of the green grains, and lies between 5 minutes and 2 hours. The sintering furnace may be a rotary tubular kiln, a swinging kiln or a gravity-feed furnace. The resultant abrasive material crystallites have a density of more than 95% of theoretic density and, because of the relatively low sintering temperature, a microcrystalline structure with a crystallite size not exceeding 4 $\mu$.

If the proportion of the dispersable aluminum oxide monohydrate exceeded 60%, by weight, the material shrinks considerably during drying and sintering, which negatively influences the yield and makes the operation uneconomical.

The invention will be illustrated in the following examples:

EXAMPLE 1

A mixture of 67.5%, by weight, of alumina (grain size less than 1μ), 6.75%, by weight, of Dispersal α-aluminum oxide monohydrate (grain size less than 1μ), 24.1%, by weight, of water, 1.1%, by weight, of 65% nitric acid solution and 0.27%, by weight, of $Mg(NO_3)_2$ were homogenized for about one hour in a duplex-kneader, and the resultant formable mass was extruded as strands. The extrusion pressure was 50–90 bar and the matrix holes had a diameter of 2 mm. The strands were cut into sections having a length of about 4 mm, dried and sintered for one hour at a temperature of 1450° C. The density of the sintered material was 3.82 g/cu.cm. Through electron microscopy, the crystallite size of the α-$Al_2O_3$ was found to be less than 3 μ.

This abrasive material was then used for grinding wheels and the abrasive efficiency of the grinding wheels on stainless steel was then established in comparison to that of corundum obtained by electro-smelting. The value was 295%.

EXAMPLE 2

Fifteen kilogram of an alumina hydrate, which was calcined at a temperature of 1200° C. and had a grain size of less than 30μ, was suspended in 15 l of water and milled in a ball mill with aluminum oxide balls for 48 hours. After milling, the aluminum hydrate had a grain size of less than 2μ. One and a half kilogram of Dispersal α-aluminum oxide monohydrate 75% of which had a grain size less than 45μ, 300 g of a 65% nitric acid solution and 103 g of magnesium nitrate hexahydrate were added to the aqueous alumina suspension, and the acidified mixture was milled for another 2 hours. Sufficient water was then removed from the suspension to obtain a mass of doughy consistency and this formable mass was pressed through the matrix of an extruder. The extruded strands were cut into green granular material sections having a length of 2.5 to 4.4 mm and a diameter of 2.2 mm. This green granular material was placed in layers on ceramic plates and sintered in an electric resistance furnace in an atmosphere of air at a temperature of 1500° C. for 1.5 hours.

The sintered material had an average diameter of 1.7 mm and an average length of about 3.3 mm. The density of the abrasive material was 3.8 g/cu.cm. and the hardness (Knoop) was 2100 kg/mm$^2$. The crystallites had a size smaller than 4μ.

When used in grinding wheels, the abrasive efficiency of this material was 260% of that of electro-corundum.

EXAMPLE 3

An aqueous suspension of alumina hydrate calcined at a temperature of 1200° C. and having a grain size of less than 30μ, wherein the alumina hydrate and water were present in a weight proportion of 1:1, was milled for six hours in a ball mill equipped with an agitator and clad with polyurethane. The milled material has a grain size of less than 1μ. After adding 50%, by weight, of α-aluminum oxide monohydrate, based on the weight of the alumina, 1.5%, by weight, of a 65% nitric acid solution, based on the weight of the suspension, and 0.64%, by weight, of magnesium nitrate hexahydrate, based on the alumina content, the mixture was further milled in the ball mill for one hour. The resultant mixture was subjected to the same procedure as in Example 2 to obtain a green granular material, which was sintered for one hour at a temperature of 1450° C. The sintered granular material has a density of 3.88 g/cu.cm. and the size of its crystallites was less than 2μ.

When used in grinding wheels, the abrasive efficiency of this material was 310% of that of electro-corundum.

EXAMPLE 4

Ten kilogram of a calcined alumina hydrate having a grain size of less than 30μ was suspended in 10 l of water and milled in a ball mill with aluminum oxide balls for 36 hours until the grain size was less than 2μ. After adding 1.0 kg of a dispersable α-aluminum oxide monohydrate and 200 g of a 65% solution of nitric acid, the suspension was further milled for three hours.

The resultant material was placed on plates in a thickness of 5 to 10 cm, water was removed at a temperature of 80° C. and the material was dried to assume the form of hard, brittle plates. These plates were comminuted in a hammer mill into grains, classified in a screening machine, and the resultant fine particles were recycled to the process. The green granular material was sintered in an electric resistance furnace for two hours at a temperature of 1500° C. The density of the sintered granular material was 3.79 g/cu.cm. and the size of the crystallites was less than 4μ.

When used in grinding wheels, the abrasive efficiency of this material was 260% of that of electro-corundum.

All of the abrasive materials produced in the above examples were used in grinding wheels and subjected to a series of tests on stainless steel. The indicated abrasive efficiency was determined on the basis of the proportion of the abraded stainless steel to wear of grinding wheel, the abrasive efficiency of electro smelted corundum being 100%. As indicated in the following table, the abrasive material according to this invention had a substantially greater abrasive efficiency than abrasive materials commercially used for coarse grinding wheels.

Table of Abrasive Efficiency

Electrically smelted corundum: 100%
Zirconium corundum: 209%
Sintered corundum according to DE-OS No. 1,471,331: 126%
Sintered corundum according to U.S. Pat. No. 4,252,544: 252%
Sintered corcundum according to
  Example 1: 295%
  Example 2: 260%
  Example 3: 310%
  Example 4: 260%

What we claim is:

1. A method of manufacturing a sintered, microcrystalline α-$Al_2O_3$ abrasive material having a purity of at least 98.5% and a density of at least 95% of theoretical density, the α-$Al_2O_3$ crystallites of the material being smaller than 4μ, which comprises the steps of
  (a) preparing a mixture of finely milled, calcined alumina and 1 to 60%, by weight, of a highly dispersable α-aluminum oxide monohydrate,
  (b) reacting said mixture with water and an acid,
  (c) homogenizing the reacted mixture until a formable mass has been obtained,
  (d) forming the mass into shaped bodies, and (e) sintering the shaped bodies for 5 minutes to 2 hours at a temperature between 1300° C. and 1700° C.

2. The manufacturing method of claim 1, wherein at least one element from the group consisting of Mg, Si, Ti, Zr, Cr, Ni, Ce, Fe and Mn is added to the mixture in the preparation thereof.

3. The manufacturing method of claim 2, wherein no more than 1%, by weight, of said element or elements, based on the alumina content of the abrasive material, is added in the preparation of said mixture in the form of an oxide thereof.

4. The manufacturing method of claim 1, wherein the mass is comminuted to form it into the shaped bodies.

5. The manufacturing method of claim 1, wherein the mass is pressed into shaped bodies of a regular geometric shape.

6. The manufacturing method of claim 1, wherein the grain size of the calcined alumina and the highly dispersable α-aluminum oxide monohydrate is smaller than $2\mu$.

7. The manufacturing method of claim 6, wherein the grain size of the calcined alumina and the highly dispersable α-aluminum oxide monohydrate is smaller than $1\mu$.

8. The manufacturing method of claim 1, wherein a homogenous mixture of the finely milled, calcined alumina and 2 to 30%, by weight, of a highly dispersable α-aluminum oxide monohydrate is prepared.

9. The manufacturing method of claim 8, wherein at least one element from the group consisting of Mg, Si, Ti, Zr, Cr, Ni, Ce, Fe and Mn is added to the homogenous mixture in the preparation thereof.

10. The manufacturing method of claim 9, wherein no more than 1%, by weight, of said element or elements, based on the alumina content of the abrasive material, is added in the preparation of said mixture in the form of an oxide thereof.

11. The manufacturing method of claim 1, wherein an amount of the acid is added to the mixture to adjacent the pH-value thereof to 2 to 3.

12. The manufacturing method of claim 1, wherein the acid is nitric acid.

13. The manufacturing method of claim 1, wherein the sintering temperature is between 1350° C. and 1550° C.

14. A method of manufacturing a sintered, microcrystalline α-Al$_2$O$_3$ abrasive material having a purity of least 98.5% and a density of at least 95% of theoretical density, the α-Al$_2$O$_3$ crystallites of the material being smaller than $4\mu$, which comprises the steps of
  (a) suspending a mixture of finely milled, calcined alumina and 1 to 60%, by weight, of a highly dispersable α-aluminum oxide monohydrate in water.
  (b) adding an acid to the suspension until the same has a pH-value between 2 and 3.
  (c) milling the acidified suspension until the grain size is less than 2 μm.
  (d) removing sufficient water from the milled suspension to obtain a formable mass,
  (d) forming the mass into shaped bodies, and
  (e) sintering the shaped bodies for 5 minutes to 2 hours at a temperature between 1300° C. and 1700° C.

15. The manufacturing method of claim 14, wherein at least one element from the group consisting of Mg, Si, Ti, Zr, Cr, Ni, Ce, Fe and Mn is added to the mixture in the preparation thereof.

16. A method of manufacturing a sintered, microcrystalline α-Al$_2$O$_3$ abrasive material having a purity of at least 98.5% and a density of at least 95% of theoretical density, the α-Al$_2$O$_3$ crystallites of the material being smaller than $4\mu$, which comprises the steps of
  (a) suspending calcined alumina in water,
  (b) milling the calcined alumina until the grain size is less than $2\mu$.
  (c) adding an amount of highly dispersable α-aluminum oxide monohydrate sufficient to produce a mixture of the calcined alumina and the α-aluminum oxide monohydrate wherein the monohydrate constitutes between 1 and 60%, by weight,
  (d) adding an acid to the mixture until the same has a pH-value between 2 and 3,
  (e) milling the acidified mixture for no more than three hours,
  (f) removing sufficient liquid from the milled mixture to obtain a formable mass,
  (d) forming the mass into shaped bodies, and
  (e) sintering for 5 minutes to 2 hours at a temperature between 1300° C. and 1700° C.

17. The manufacturing method of claim 16, wherein at least one element from the group consisting of Mg, Si, Ti, Zr, Cr, Ni, Ce, Fe and Mn is added to the mixture in the preparation thereof.

18. The manufacturing method of claim 14, wherein the sintering temperature is between 1350° C. and 1550° C.

19. The manufacturing method of claim 16, wherein the sintering temperature is between 1350° C. and 1550° C.

* * * * *